United States Patent [19]

Yamada et al.

[11] Patent Number: 5,226,028

[45] Date of Patent: Jul. 6, 1993

[54] CENTERING MECHANISM FOR AUTOMOTIVE DISK PLAYER

[75] Inventors: Yoshinori Yamada; Kiyoshi Morikawa; Masakazu Kurumada; Kazuo Kobayashi; Masanori Sugihara, all of Saitama, Japan

[73] Assignee: Pioneer Electronic Corporation, Tokyo, Japan

[21] Appl. No.: 865,134

[22] Filed: Apr. 8, 1992

Related U.S. Application Data

[62] Division of Ser. No. 480,457, Feb. 15, 1990, Pat. No. 5,113,388.

[30] Foreign Application Priority Data

| Feb. 16, 1989 | [JP] | Japan | 1-34972 |
| Feb. 21, 1989 | [JP] | Japan | 1-41129 |
| Feb. 27, 1989 | [JP] | Japan | 1-46100 |
| Mar. 3, 1989 | [JP] | Japan | 1-52604 |
| Mar. 3, 1989 | [JP] | Japan | 1-52605 |

[51] Int. Cl.⁵ ............... G11B 23/00; G11B 25/00; G11B 33/02
[52] U.S. Cl. ............... 369/77.1; 369/233; 369/270
[58] Field of Search ............... 369/77.1, 270, 233

[56] References Cited

U.S. PATENT DOCUMENTS

| 4,498,162 | 2/1985 | Schatteman | 369/77.1 |
| 4,523,306 | 6/1985 | Staar | 369/77.1 |
| 4,539,670 | 9/1985 | Inaba et al. | 369/77.1 |
| 4,553,231 | 11/1985 | d'Alayer de Costemore d'Arc | 369/263 |
| 4,570,256 | 2/1986 | Tamaru | 369/271 |
| 4,701,902 | 10/1987 | Aoyagi et al. | 369/77.1 |
| 4,731,777 | 3/1988 | Yoshitoshi et al. | 369/263 |
| 4,733,387 | 3/1988 | Yoshimura | 369/77.1 |
| 4,791,624 | 12/1988 | Stinesen | 369/270 |
| 4,839,880 | 6/1989 | d'Alayer de costenore d'Arc | 369/75.2 |
| 4,979,160 | 12/1990 | Araki | 369/77.1 |
| 5,022,023 | 6/1991 | Toyoguchi | 369/77.1 |
| 5,025,436 | 6/1991 | Crain et al. | 369/77.1 |
| 5,031,171 | 7/1991 | Kurumada et al. | 369/270 |
| 5,054,016 | 10/1991 | d'Alayer et al. | 369/77.1 |
| 5,056,077 | 10/1991 | Morikawa et al. | 369/77.1 |

FOREIGN PATENT DOCUMENTS

| 200705 | 12/1986 | European Pat. Off. |
| 206831 | 12/1986 | European Pat. Off. |
| 296829 | 12/1988 | European Pat. Off. |
| 331663 | 9/1989 | European Pat. Off. |
| 3130184 | 3/1982 | Fed. Rep. of Germany |
| 3314400 | 11/1983 | Fed. Rep. of Germany |
| 3402491 | 8/1984 | Fed. Rep. of Germany |
| 3914209 | 11/1989 | Fed. Rep. of Germany | 369/77.1 |
| 60-214450 | 10/1985 | Japan | 369/77.1 |

*Primary Examiner*—John W. Shepperd
*Assistant Examiner*—Michael C. Kessell
*Attorney, Agent, or Firm*—Sughrue, Mion, Zinn, Macpeak & Seas

[57] ABSTRACT

A vehicle disk player is disclosed in which a disk is inserted through a disk inserting opening, the disk is fixedly mounted on a turn table by a clamper arm when conveyed to a predetermined position in the player, the turn table is rotated for reproduction of data recorded in the disk, and reproducing means including the clamper arm and turn table are supported in a floating manner. The player is provided with a centering mechanism for positioning said disk at the middle of the disk inserting opening with centering pins. The centering pins are arranged out of the range of vibration of the disk which is fixedly mounted on said turn table supported in a floating manner.

3 Claims, 12 Drawing Sheets

CENTERING MECHANISM FOR AUTOMOTIVE DISK PLAYER

This is a divisional of application Ser. No. 07/480,457 filed Feb. 15, 1990 U.S. Pat. No. 5,113,388.

BACKGROUND OF THE INVENTION

This invention relates to a disk player mounted on a vehicle with a centering mechanism which, in inserting a disk into the disk inserting opening thereof, operates to position the disk at the center of the disk inserting opening.

Recently, a compact disk has been developed which has a recording layer having pits corresponding to digital signals obtained by converting analog sounds (hereinafter referred merely as "a disk", when applicable). With the disk, analog sounds are optically reproduced by using a laser beam applied by the reading head of a CD (compact disk) player. The disk is much superior both in tone quality and in operability to conventional LP record disks. Hence, the compact disk together with its CD player has quickly come into wide use. Accordingly, DC players to be mounted on vehicles have been developed (hereinafter referred to as "vehicle disk players", when applicable). One example of the vehicle disk players is as shown in FIG. 1. In FIG. 1, reference numeral 101 designates a disk 12 cm in diameter in which pieces of music have been recorded. When the disk 101 is inserted into a disk inserting opening 102, it is conveyed to a predetermined position (which is substantially the center of the CD player) by a loading mechanism 103, where it is fixedly mounted on the turn table 105 by a clamper arm 104. The disk 101 thus mounted is rotated b-y a spindle motor (not shown), so that the pieces of music are reproduced with a reading head (not shown). In the vehicle CD player, the clamper arm 104, the turn table, and the reading head are supported in floating manner so that they are substantially free from vibration during traveling.

On the other hand, a disk 106 of 8 cm in diameter, which is much smaller in diameter than the disk 101 of 12 in diameter, has been proposed in the art.

The above-described conventional vehicle CD player suffers from the following difficulties: It is rather difficult to insert a disk into the disk inserting opening 102 at the middle, and therefore it is necessary to use the centering mechanism. Particularly it is difficult to insert the 8 cm disk into the disk inserting opening 102 at the middle, because the disk inserting opening 102 is large. If, in inserting the disk into the opening 102, it is shifted from the middle of the opening 102, then it is impossible to set the disk at the predetermined position on the turn table.

This difficulty may be eliminated by provision of the centering mechanism which moves the disk to the middle of the disk inserting opening if it is shifted there-from. That is, the centering mechanism has a centering pin which, when a disk is inserted into the disk inserting opening, limits the shifting of the disk from the middle of the opening. The centering pin, located near the disk inserting opening, may result in the following difficulty: In the case where a 12 cm large disk 101 is mounted on the turn table 105, the centering pin and the disk 101 may collide with each other by vibration of the vehicle traveling.

SUMMARY OF THE INVENTION

In view of the foregoing, an object of this invention is to provide a disk player in which, even if the disk player is greatly vibrated during the traveling of the vehicle, each of the small and large diameter disks can be readily inserted into the disk inserting opening at the middle, and even when a large disk 101 of 12 cm in diameter is inserted, the disk and the centering pin will not collide with each other.

The foregoing object of the invention has been achieved by the provision of a vehicle disk player in which a disk is inserted through a disk inserting opening, the disk is fixedly mounted on a turn table by a clamper arm when conveyed to a predetermined position in the player, the turn table is rotated for reproduction of data recorded in the disk, and reproducing means including the clamper arm and turn table are supported in floating manner, which, according to the invention, comprises: a centering mechanism for positioning the disk at the middle of the disk inserting opening with centering pins, the centering pins being arranged out of the range of vibration of the disk which is fixedly mounted on the turn table supported in floating manner.

A vehicle disk player is, in general, on the front panel or the like of the vehicle. Therefore, the vehicle disk player is vibrated during traveling of the vehicle. Therefore, it is rather troublesome for the operator to insert a smaller diameter disk into the disk inserting opening at the middle; that is, he cannot position the disk at the middle of the disk inserting opening without turning his attention to it. However, since the centering mechanism is provided near the disk inserting opening, the disk can be readily positioned at the middle of the disk inserting opening with the aid of the centering pins of the centering mechanism. The supporting frame supporting the player body is supported by the stationary frame in a shock absorbing mode; that is, it is supported in floating manner. Therefore, the disk mounted on the turn table may collide the centering pins of the centering mechanism. Especially with a large diameter (12-cm) disk, this probability of collision is high. However, since the centering pins are located outside the range of vibration, the disk will never collide with the centering pins during reproduction.

A vehicle disk player is, in general, on the front panel or the like of the vehicle. Therefore, the vehicle disk player is vibrated during traveling of the vehicle. Therefore, it is rather troublesome for the operator to insert a smaller diameter disk into the disk inserting opening at the middle; that is, he cannot position the disk at the middle of the disk inserting opening without turning his attention to it. However, since the centering mechanism is provided near the disk inserting opening, the disk can be readily positioned at the middle of the disk inserting opening.

The centering mechanism comprises a pair of centering arms which are rockably provided at the disk inserting opening in such a manner that the centering arms are spaced away from each other, and which have abutting portions adapted to abut against the periphery of the disk, respectively; and a centering lever coupled to the two centering arms, to rock, when the disk inserted into the disk inserting opening abuts against the abutting portions of the two centering arms simultaneously, the centering arms in such a manner as to move the abutting portions away from each other, and to lock, when the disk inserted into the disk inserting opening abuts against the abutting portion of only one of the centering arms, the rocking motion of the centering arm. Therefore, the centering mechanism can be made up of a relatively small number of components, and it can positively guide the disk to the middle of the disk inserting opening.

The foregoing object of the invention has been achieved by the provision of a vehicle disk player in which a compact disk is inserted through a disk inserting opening, the disk is fixedly mounted on a turn table by a clamper arm when conveyed to a predetermined position in the player, and the turn table is rotated for reproduction of data recorded in the disk, which, according to the invention, comprises a centering mechanism which has a pair of centering boards which are slidably piled one on another and are urged towards each other; a pair of centering pins which are embedded in the pair of centering boards, respectively, to abut against the periphery of the disk; a pair of U-shaped guide holes formed respectively in the centering boards in such a manner that the guide holes are symmetrical with each other; and guide pins which are connected to the centering boards and are loosely fitted in the guide holes, respectively.

In the disk player of the invention, the centering mechanism is constructed as follows: Two plate-shaped centering boards are piled one on another in such a manner that they are slidable longitudinally, and abutting members adapted to abut against the periphery of a compact disk are extended downwardly from the end portions of the centering boards, respectively. A pair of U- shaped guide holes are formed in the centering boards, respectively, in such a manner that the guide holes are symmetrical in configuration with each other. Guide pins secured to the centering boards are loosely fitted in the guide holes of their opposite centering boards, respectively.

In the case when the disk inserted in the disk inserting opening is brought into contact with one of the abutting members, only the guide pin on the side of the one of the abutting members is positioned at the elongated portion of the U-shaped guide hole which is extended longitudinally of the centering board, while the other guide pin is held abutted against the base portion of its own U-shaped guide hole. When the disk is brought into contact with the two abutting members at the same time, the two guide pins are positioned at the elongated portions of the U- shaped guide holes, respectively, so that the centering boards are allowed to longitudinally move away from each other.

In the disk player of the invention, the centering mechanism is provided near the disk inserting opening. The centering mechanism includes one pair of stopper arms which are arranged in such a manner that they are in parallel with each other and are spaced from each other in the disk inserting direction. The stopper arms are made rockable about fulcrums provided at the middles, respectively. One pair of centering cams, each having a large diameter portion and a small diameter portion, are interposed between the stopper arms at both ends in such a manner that the small diameter portion and the large diameter portion of one of the centering cam are in contact with one of the stopper arms and the other, respectively, while the large diameter portion and the small diameter portion of the other centering cam are in contact with the one stopper arm and the other stopper arm, respectively. When the inserted disk is abutted against the centering pin of one of the centering cams, the stopper arms are locked by the other centering cam, thus preventing the rotation of the one centering cam. When the inserted disk are abutted against the centering pins of both of the centering cams, the centering cams are turned in opposite directions, so that, at the contact points between the centering cams and the stopper arms, the small diameter portion and the large diameter portion are switch over to each other As a result, the stopper arms are turned about the fulcrums.

The centering mechanism thus constructed can be positioned in a small space defined by the two stopper arms in the disk inserting direction. Therefore, the centering mechanism is compact, and operates with high accuracy.

A vehicle disk player is, in general, mounted on the front panel or the like of the vehicle. Therefore, the vehicle disk player is vibrated during traveling of the vehicle. Therefore, it is rather troublesome for the operator to insert a smaller diameter disk into the disk inserting opening at the middle; that is, he cannot position the disk at the middle of the disk inserting opening without turning his attention to it. However, since the centering mechanism is provided near the disk inserting opening, the disk can be readily positioned at the middle of the disk inserting opening with the aid of the centering pins of the centering mechanism.

The centering pins are so positioned that, when the disk is positioned substantially at the middle of the disk inserting opening, the disk's front end thus inserted is abutted against the centering pins after abutting against the loading rollers. Therefore, if the disk is shifted from the middle of the disk inserting opening when inserted thereinto, the centering pins will guide the disk to the middle of the disk inserting opening. If, on the other hand, the disk is positioned substantially at the middle of the disk inserting opening, the disk's front end is first nipped by the loading rollers, and then the disk is abutted against the centering pins after the loading rollers start conveyance of the disk which has been left from the operator's hand.

BRIEF DESCRIPTION OF THE DRAWINGS

FIG. 18(b) is an explanatory diagram showing the centering mechanism of FIG. 17 moving into position to allow a small disk to pass through;

DESCRIPTION OF THE PREFERRED EMBODIMENTS

One embodiment of this invention will be described with reference to the accompanying drawings. FIGS. 2 through 11 show one example of a vehicle CD player according to the invention.

Figure 1:
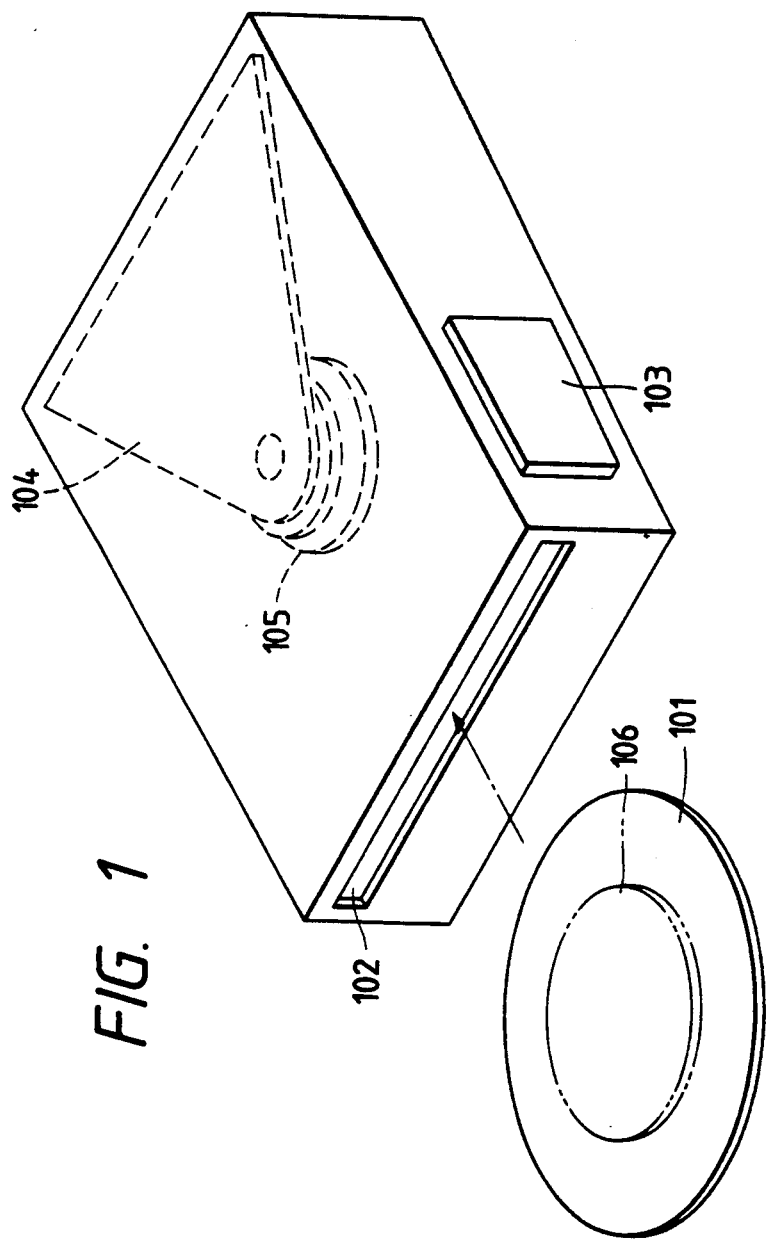
FIG. 1 is a perspective view of a conventional vehicle CD player.
Figure 2:
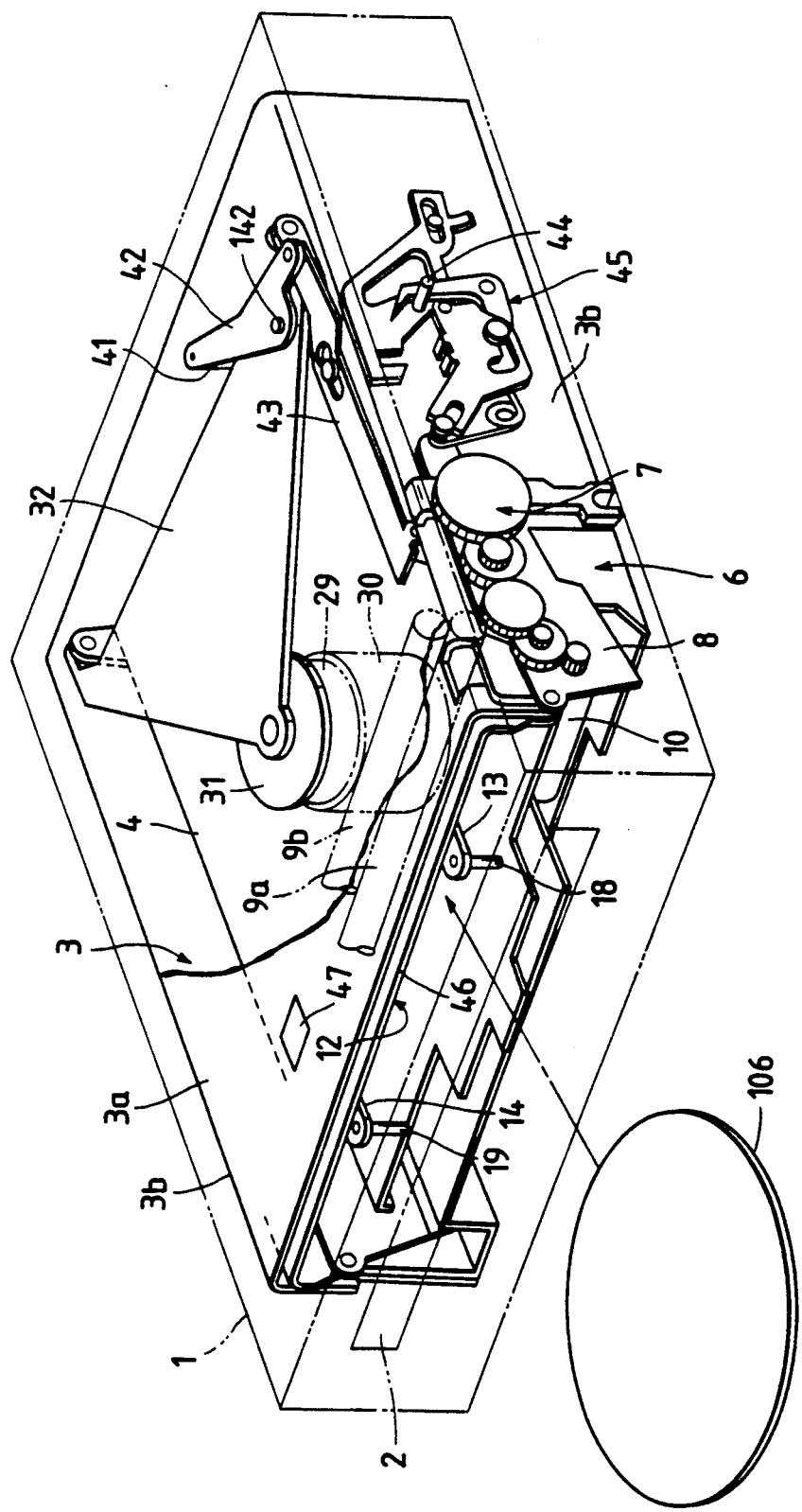
FIG. 2 is a perspective view showing one example of a vehicle CD player according to this invention.
Figure 3:
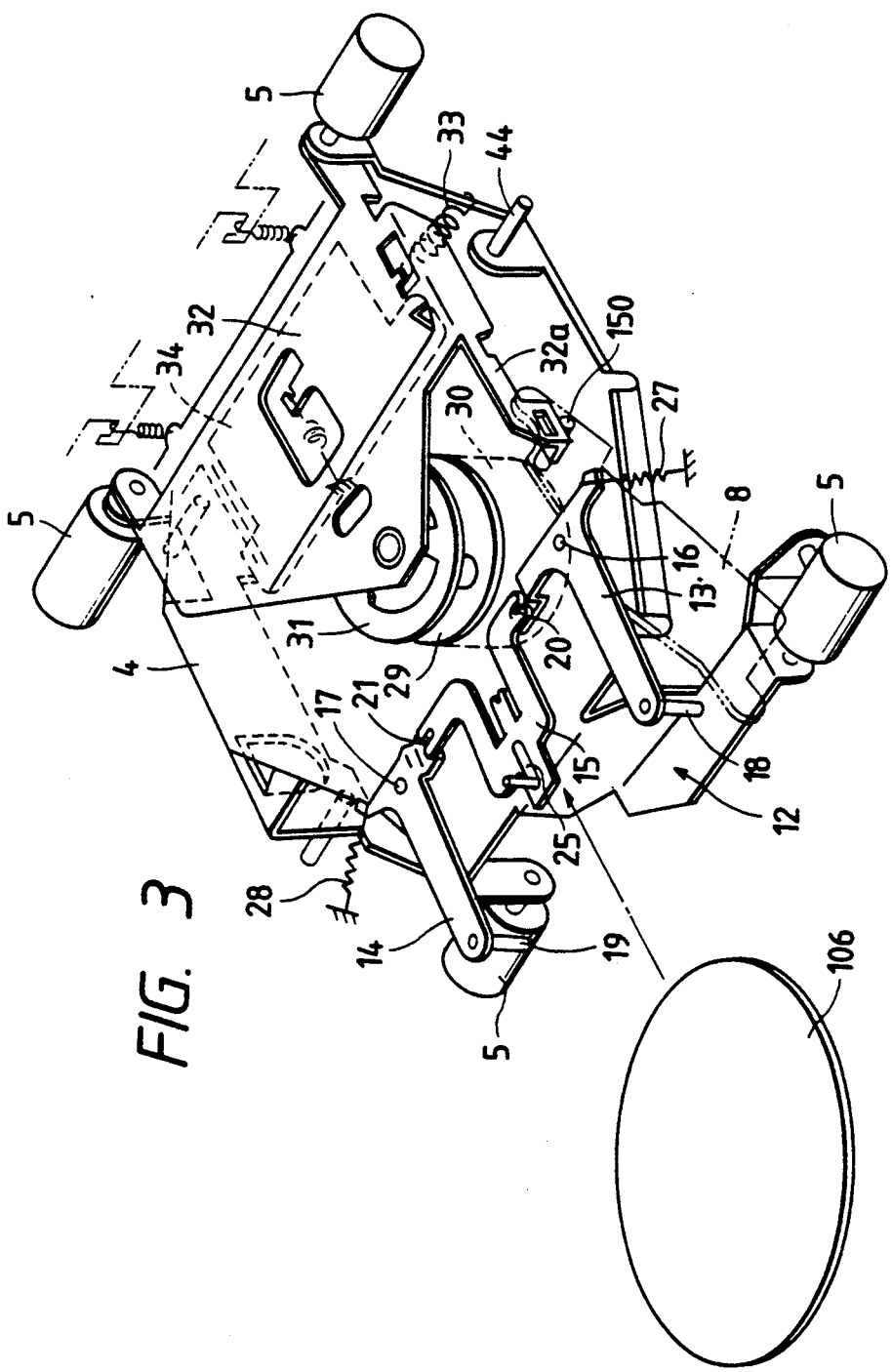
FIG. 3 is a perspective view showing a supporting frame with a centering mechanism.

In FIG. 2, reference numeral 1 designates the casing of the vehicle CD player according to the invention. A disk inserting opening 2 is formed in the front wall of the casing 1. A frame 3 is provided in the casing 1. The frame 3 is made up of a top plate 3a which is substantially in the form of a flat plate, and side plates 3b and 3b extended downwardly from both ends of the top plate 3a. A supporting frame 4 as shown in FIG. 3 is provided inside the frame 3. A reproducing means for reproducing music recorded in disks is mounted on the supporting frame 4 substantially at the center. The supporting frame 4 is supported through dampers 5 by the frame 3 in floating manner. A loading mechanism 6 and a loading arm lowering mechanism 7, which are used to move a disk 101 inserted into the disk inserting opening 2 to a predetermined position (substantially the center of the supporting frame 4) are provided through a loading arm 8 on one side of the front end portion of the frame 3. The loading mechanism 6 has a driving roller 9a which is supported by the supporting frame 4. The detailed explanation of loading mechanism 6 and the loading arm lowering mechanism 7, and a lock mechanism 45 (described latter) have been described in the specification of Japanese Utility Patent Application No. 136632/1987 in detail. A loading motor 10 is provided in the frame 3 at the front end portion to rotate the driving roller 9a. The driving roller 9a thus rotated delivers the disk 106 inserted into the disk inserting opening 2 to the predetermined position in cooperation with a driving roller 9b engaged with the driving roller 9a.

Figure 4:
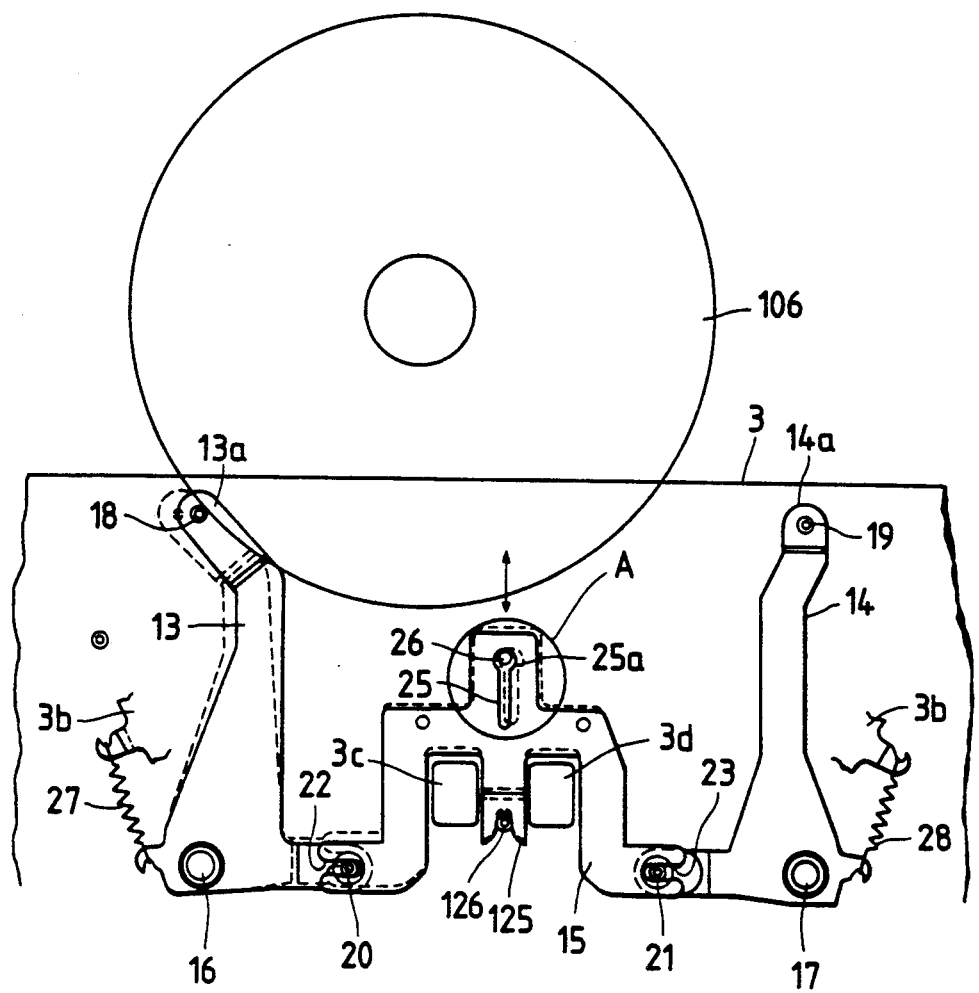
FIG. 4 is a plan view of the centering mechanism.
Figure 5:
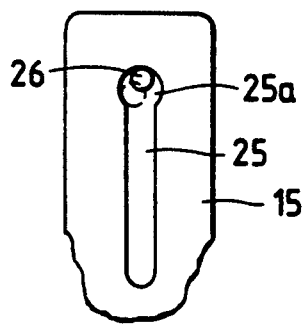
FIG. 5 is an enlarged view of the part A in FIG. 4.

A centering mechanism 12 (FIG. 3) for positioning the disk 106 at the middle of the disk inserting opening 2 is provided inside the frame 3 and near the disk inserting opening 2. The centering mechanism 12, as shown in FIG. 4, comprises: a pair of centering arms 13 and 14; and a centering lever 15 interposed between with the centering arms 13 and 14. Each of the centering arms 13 and 14 is substantially L-shaped The centering arms 13 and 14 are pivotally mounted on the frame 3 through supporting pins 16 and 17 which are embedded in the middle portions of the centering arms 13 and 14, respectively. The centering arms 13 and 14 have centering pins 18 and 19 at the end portions which are closer to the disk inserting opening 2, respectively. That is, the centering pins 18 and 19 are located sufficiently remote from the center of the supporting frame 4. The centering pins 18 and 19 may be dispensed with. In this case, tip ends 13a and 14a of the arms 13 and 14 may be used as the contact portions with the edge of the disc 106. The centering arms 13 and 14 further have coupling pins 20 and 21 at the other end portions, respectively The centering lever 15 is substantially inverted-W-shaped, and has coupling grooves 22 and 23 at both ends. The coupling grooves 22 and 23 are engaged with the coupling pins 20 and 21, respectively, so that the two centering arms 13 and 14 are coupled to the right and left ends of the centering lever 15. The centering lever 15 has a hole 25 which is elongated along the disk inserting direction. The elongated hole 25, as indicated at 25a in FIG. 5, is circular at the end closer to the disk inserting opening 2 (hereinafter referred to as "a circular head hole 25a" when applicable). A guide pin 26 embedded in the frame 3 is loosely fitted in the elongated hole 25 so that it is movable along the elongated hole 25. The middle portion of the centering lever 15 has a guide groove 125 at the other end portion. The guide groove 125 is engaged with a guide pin 126 fixedly embedded in the frame top plate 3a.

The protrusion with the guide groove 125 is disposed between a pair of guide protrusion 3c and 3d extended from the frame 3 so that it is guided by the guide protrusions 3c and 3d. Hence, the centering lever 15 is movable in the disk inserting direction.

Tension springs 27 and 28 are connected between the centering arms 13 and 14 and protrusions 3b and 3b of the frame 3, respectively, to urge the centering pins 18 and 19 to approach each other. The distance between the centering pins 18 and 19 is set at about 8 cm under the free condition.

It is assumed that the small diameter disk 106 is inserted into the disk inserting opening 2 in such a manner that it is shifted sidewards from the middle of the latter 2. In this case, the disk is brought into contact with one of the centering pins 18 and 19. When the disk 106 is brought into contact with the centering pin 18 as shown in FIG. 4, then the centering arm 13 is slightly turned counterclockwise about the supporting pin 16 against the elastic force of the tension spring 27. As c result, the centering lever 15 is slightly turned clockwise as a whole. As the centering lever 15 is turned in this manner, as shown in FIG. 5 the guide pin 26 is caused to move from the center of the circular head hole 25a to abut against the lower left part (in FIG. 5) of the wall of the circular head hole 25a. Accordingly, the guide pin 26 cannot move in the elongated hole 25 relative to the centering lever; that is, the centering lever 15 cannot move towards the disk inserting opening 2. Therefore, the centering arm 13 is slightly swung by the disk 106, but it is not swung further. Thus, the disk 106 shifted sidewards is caused to position at the middle of the disk inserting opening 18, being regulated by the centering pin 18.

When the disk 101 is positioned at the middle of the disk inserting opening 2, then it is brought into contact with the two centering pins 18 and 19 at the same time. In this case, the centering arms 13 and 14 are turned about the supporting pins 16 and 17, respectively, to move both sides of the centering lever 15 towards the disk inserting opening 12 simultaneously. In this case, the guide pin 26 is not shifted in the widthwise direction of the elongated hole 25; that is, it is movable relative to the centering lever in the elongated hole 25. Therefore, the centering lever 15 is moved towards the disk inserting hole 2. As the centering lever 15 is moved in this manner, the centering arms 13 are further turned, so that the disk 101 can be inserted into the vehicle CD player.

As shown in FIG. 3, a turn table 29, on which a disk 106 is mounted, is provided on the supporting frame 4 substantially at the center. The turn table 29 is rotated by a spindle motor 30 provided below the supporting frame 4. A small-disk-shaped clamper 31 is arranged over the turn table 29. More specifically, the clamper 31 is coupled to the triangular end portion of a clamper arm 32 which is rockably connected to the rear end of the supporting frame 4. A tension spring 33 is connected between the clamper arm 32 and the supporting frame 4 to urge the clamper arm 32 towards the turn table 29.

Figure 6:
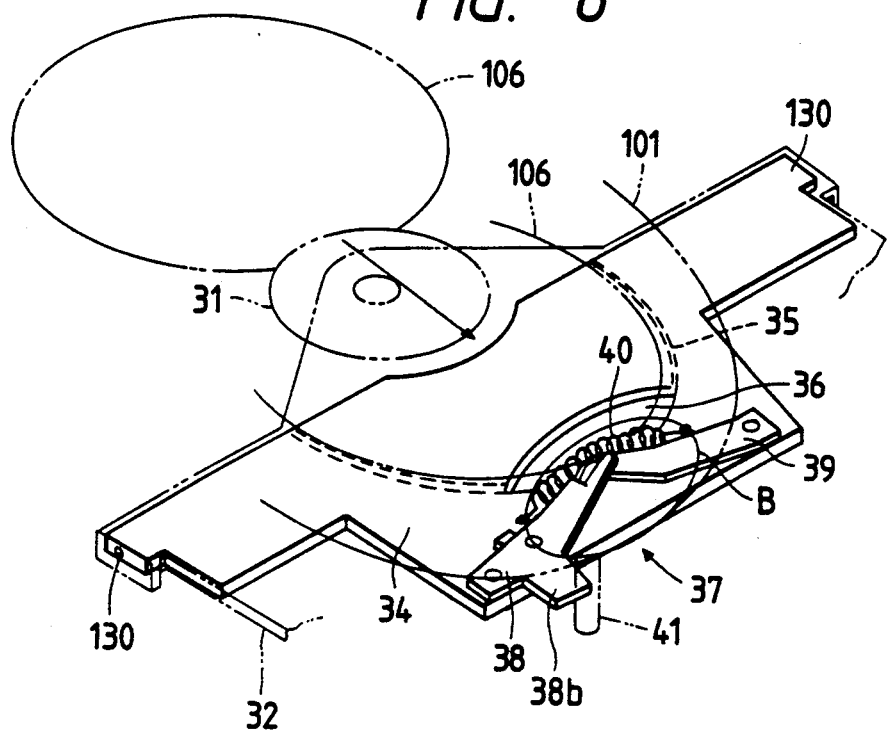
FIG. 6 is a perspective view showing an operating assist board and a depressing assist mechanism.
Figure 7:
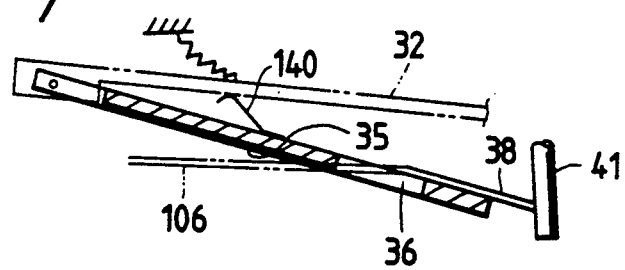
FIG. 7 is a sectional view of the operating assist board and the depressing assist mechanism.

As shown in FIGS. 6 and 7, an operating assist board 34 is provided below the clamper arm 32. When the smaller diameter 8-cm disk 106 is moved and positioned above the turn table 29, the operating assist board 34 operates a detecting pin 41 to mount the disk 106 on the turn table 29. The operating assist board 34 is swingably coupled to the pivot points 130 and 130 provided at both sides of the front end portion of the clamper arm 32, and is urged downwardly by a leaf spring 140. The operating assist board 34 has an arcuate disk recess 35 in the lower surface. The arcuate disk recess 35 is so shaped as to be receive an 8-cm disk. Therefore, when the small diameter disk 106 is moved towards the predetermined position, it is fitted in the disk recess 35. The disk recess 35 has a hole 36 in the rear end portion in such a manner that the hole 36 is confronted with the central portion of a depressing assist mechanism 37 which is provided above the operating assist board 34. Therefore, when the disk 106 is led into the disk recess 35, its end portion abuts against the depressing assist mechanism 37 to operate the latter 37.

When the large diameter 12-cm disk 101 is moved to the turn table 29, it is not fitted into the disk recess 35 because it is larger than the latter; that is, it is moved over the disk recess 35 as it is, and it is mounted on the turn table 29 after abutting against the detecting pin 41 with its periphery.

When the 12-cm disk 101 has been mounted on the turn table 29, the centering pins 18 and 19 are sufficiently spaced away from the disk because the pins 18 and 19 are positioned sufficiently away from the center of the turn table 19. Accordingly, even if the 12-cm disk 101 is horizontally vibrated on the turn table 29, the centering pins 18 and 19 and the disk will not collide with each other because the centering pins 18 and 19 are located outside the range of vibration.

Figure 8:
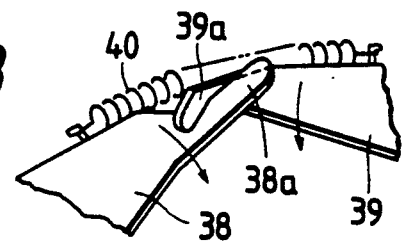
FIG. 8 is an enlarged view of the part B in FIG. 6.

The depressing assist mechanism 37 has a pair of swing arms 38 and 39. The swing arms 38 and 39 are pivotally mounted through their base portions on the operating assist board 34. A tension spring 40 is connected between the swing arms 38 and 39, so that the end portions 38a and 39a thereof are engaged with each other as shown in FIG. 8. When being pushed through the hole 36 by the end portion of the small diameter disk 106, the end portions 38a and 39a are swung as if doors were opened. A protrusion 38b is extended from the swing arm 38 in such a manner that it is confronted with the detecting pin 41. Therefore, when the swing arm 38 is swung, the protrusion 38b depresses the detecting pin 41.

Figure 9:
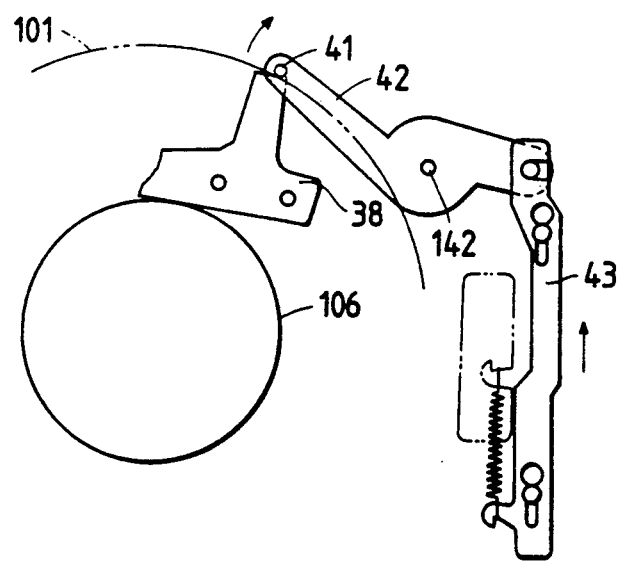
FIG. 9 is a plan view showing first and second links.

As shown in FIG. 9, the detecting pin 41 is embedded in one end portion of a first link 42 which is pivotally mounted on the rear end portion of the frame 3. The other end portion of the first line 42 is coupled to one end portion of a second link 43 which is slidable in the disk inserting direction. When the detecting pin 41 is pushed through the swing arm by the small diameter disk 106 or directly by the periphery of the large diameter disk 101, the second link 43 is slid to unlock the loading arm mechanism 7, thereby to permit the clamper arm 32 to move downwardly.

On the other hand, as shown in FIGS. 2 and 3, a lock pin 44 is embedded in the side wall of the supporting frame 4 in such a manner as to extend towards the side wall of the frame 3. A locking mechanism 45 is provided on the frame 3 in such a manner that it is confronted with the lock pin 44, so that, until the disk inserted is moved to the predetermined position, the lock pin 44 is locked by the locking mechanism 45, and the supporting frame 4 is secured to the frame 3. As the loading arm 8 is moved downwardly by the loading arm operating mechanism 7, the clamper arm 32 is moved downwardly, and the locking mechanism 45 unlocks the lock pin 44, so that the supporting frame 4 is supported through dampers 5 in a shock absorbing mode.

A movable lid 46 is provided on the frame near the disk inserting opening 2, in such a manner that, when the vehicle CD player is in operation, it is moved to the disk inserting opening 2 to prevent the insertion of another disk thereinto.

Now, the operation of the vehicle disk player thus constructed will be described.

The centering mechanism 12 of the invention is effective especially in handling a small diameter disk 106. Therefore, the operation will be described with reference to the case where a small diameter disk 106 is inserted into the disk inserting opening 2.

Upon insertion of a small diameter disk 106 into the disk inserting opening 2, a sensor 47 (FIG. 2) provided on the front end portion of the top plate 3a detects the insertion of the disk 106, to start the loading motor 10. If, in this case, the disk 106 is shifted sidewards from the middle of the disk inserting opening 2, it will abut against one of the pair of centering pins 18 and 19 of the centering mechanism 12, whereupon the disk 106 is positioned at the middle of the disk inserting opening 2 by the centering mechanism 12 in the above-described manner.

Under this condition, the driving roller 9a, being driven by the loading motor 10, cooperates with the driven roller 9b to convey the disk 106 towards the turn table 29. When the disk has come near the center of the turn table, it is fitted in the disk recess 35 of the operating assist board 34 (because its diameter is 8 cm). When the disk 106 has been fitted in the disk recess 35, as shown in FIG. 6 the end portion of the disk 106 pushes the detecting pin 41 through the depressing assist mechanism 37 appearing in the hole 36. That is, the swing arm 38 is swung by the disk 106, so that its protrusion 38a pushes the detecting pin 41.

When the detecting pin 41 is pushed in this manner, as shown in FIG. 9 the first link 42 is swung about the pin 142, thereby to slide the second link 43 to activate the loading arm operating mechanism 7. As a result, the side protrusion 32a of the clamper arm 32 is moved downwardly by the elastic force of the tension spring as the pin 150 is moved downwardly together with the loading arm 8, whereby the disk 106 mounted on the turn table 29 is fixedly positioned thereon by the clamper 31. While the disk 106 is fixedly held by the clamper 31, in association with the operation of the loading arm operating mechanism 7 the locking mechanism 45 unlocks the lock pin 44, so that the supporting frame 4 is supported through the dampers 5 by the frame 3 in a shock absorbing mode; that is, it is supported in floating manner. Thus, the preliminary operation for reproduction has been accomplished Under this condition, the spindle motor 30 is operated to rotate the disk 106 through the turn table 29. When the disk 106 is rotated in this way, the reading head (not shown) applies a laser beam to the disk. As the reading head moves radially of the disk 106, the pieces of music recorded in the disk are reproduced.

It is difficult for the operator to insert the disk into the disk inserting opening at the middle while operating the vehicle; that is, he cannot achieve the insertion without turning his attention to it. Therefore, the insertion of a disk thereinto may result in a traffic accident. However, in the vehicle disk player according to the invention, with the aid of the centering pins 18 and 19 of the centering mechanism 12 provided near the disk inserting opening 2 the disk 106 inserted into the disk inserting opening 2 is readily set at the middle of the disk inserting opening 2. Thus, the disk 106 inserted in the disk inserting opening 2 is moved over to the turn table 29 and fixedly mounted on it. Under this condition, the reading head applies a laser beam to the disk so that the pieces of music recorded therein are reproduced.

Figure 10:
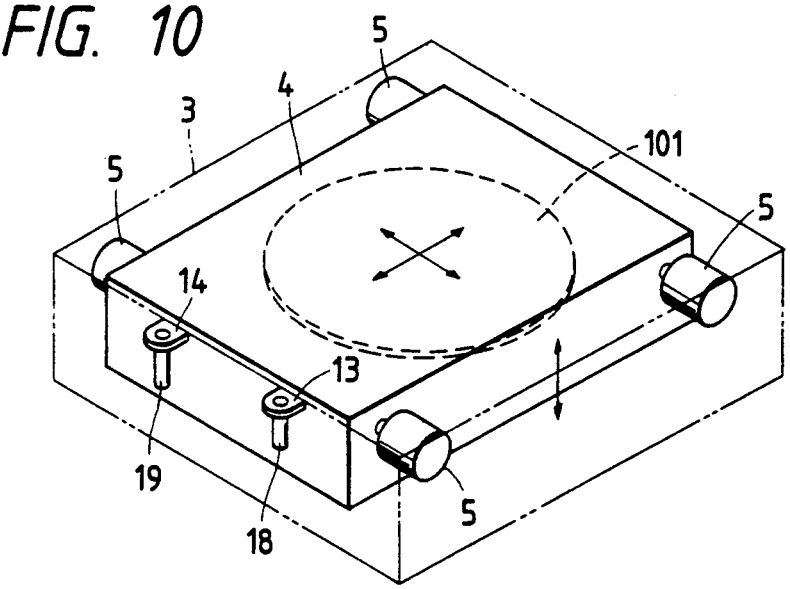
FIG. 10 is a perspective view for a description of the vibration of the supporting frame relative to a stationary frame.
Figure 11:
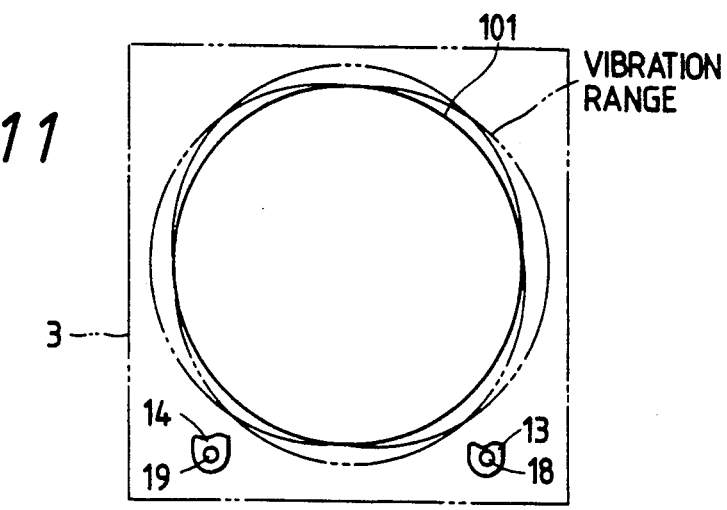
FIG. 11 is a diagram showing the range of vibration of a disk which is vibrated relative to the frame.
Figure 12:
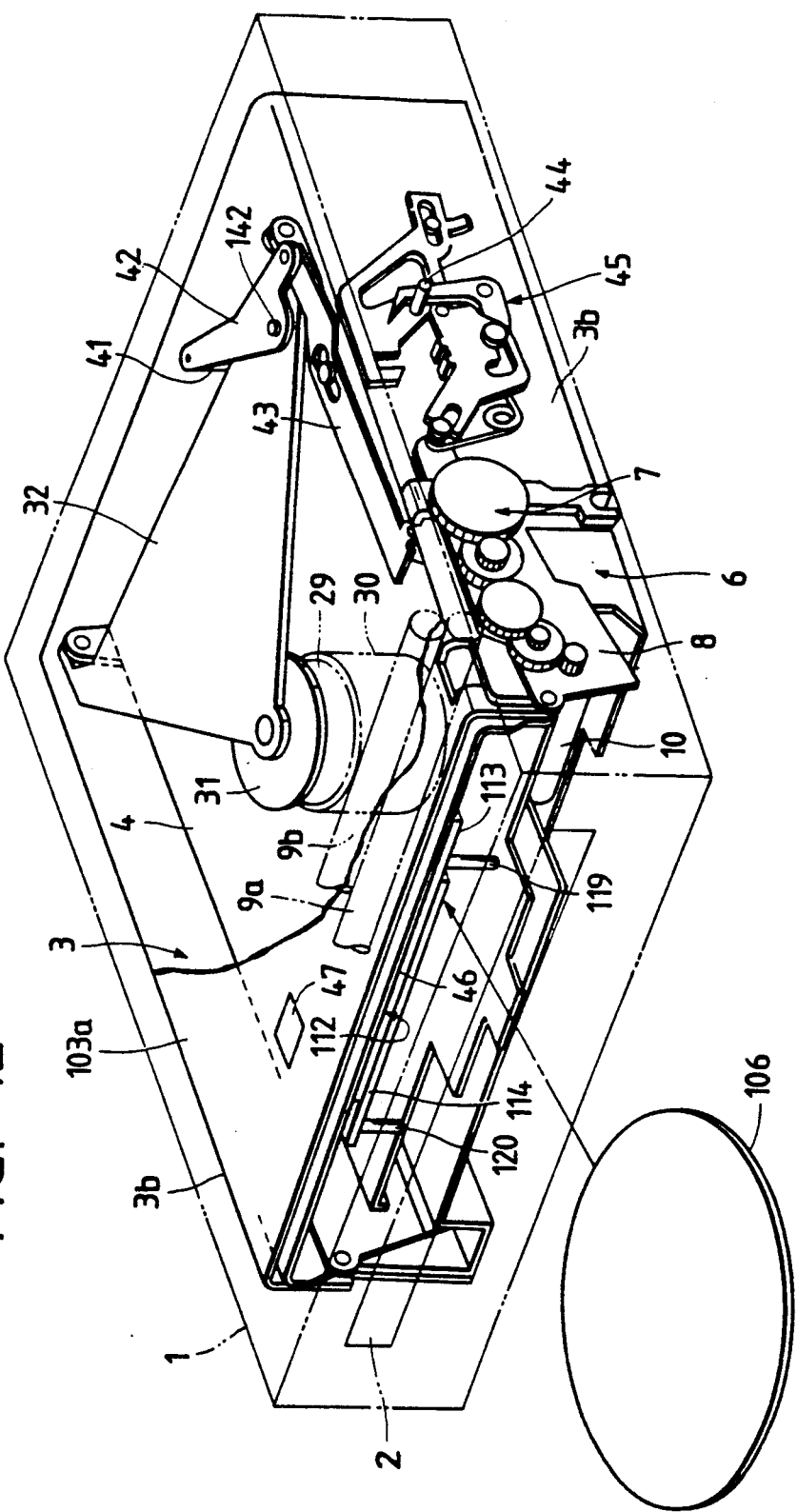
FIG. 12 is a perspective view of a CD player according to another embodiment of this invention.

As was described above, the supporting frame 4 is supported through the dampers 5 by the frame 3 in a shock absorbing mode. Therefore, when the vehicle CD player itself is vibrated as shown in FIG. 11, the vibration is not transmitted to the supporting frame 4 so much because it is substantially absorbed by the dampers 5 as shown in FIG. 10. However, since the supporting frame 4 is supported by the frame 3 in floating manner, the supporting frame 4 is vibrated three-dimensionally (back and forth, right and left, and up and down) relative to the frame 3. Accordingly, in the case of the small diameter disk 106, the positions of the centering pins 18 and 19 are not limited; however, in the case of the large diameter disk 101, the periphery of the disk 101 may collide with the centering pins 18 and 19 when the supporting frame 4 is vibrated.

However, since the centering pins 18 and 19 are positioned outside the range of back and forth vibration of the 12-cm (large diameter) disk 101, the disk 101 will not collide with the centering pins 18 and 19 during reproduction of the music recorded in it; that is, the reproduction will never be obstructed by the centering pins 18 and 19.

Let us consider the insertion of the disk 101 of 12 cm in diameter. The disk 101 can be relatively readily positioned at the middle of the disk inserting opening 2 because the diameter is substantially equal to the length of the disk inserting opening 2. When the disk 101 is abutted against the centering pins 18 and 19 at the same time, the centering arms 13 and 14 are greatly turned about the supporting pins 16 and 17, respectively, so that the centering pins 18 and 19 are spaced away from each other to the 12 cm disk 101. Thus, the 12-cm disk 101 is smoothly inserted into the vehicle CD player: that is, the insertion will not be obstructed by the centering pins of the 18 and 19.

The driving roller 9a is rotated by the loading motor 10 so as to cooperate with the driven roller 9b to convey the disk 101 thus inserted to the predetermined position.

When the disk 101 comes to the predetermined position, it is not fitted in the disk recess 35 of the operating assist board because its diameter is 12 cm, and instead it is conveyed below the operating support board 34, thus pushing the detecting pin 41 directly (without operating the depressing assist mechanism 37). The following operations are the same as in the case of the 8-cm disk 10. Upon rotation of the disk 101, the reading head applies the laser beam to the disk for reproduction of the music recorded therein.

As was described above, the vehicle disk player of the invention has the centering mechanism for moving the disk to the middle of the disk inserting opening with the centering pins. Therefore, even if the disk is shifted sidewards from the middle of the disk inserting opening when inserted thereinto, the position of the disk is regulated by the centering pins so that it is moved to the middle of the disk inserting opening. Hence, the disk is positively mounted on the turn table, and fixed thereon, for reproduction of the music with the reading head.

The centering pins of the centering mechanism are located outside the range of vibration of the disk mounted on the turn table. Hence, even if the disk on the turn table is vibrated relative to the centering pins, the disk and the centering pins will not collide with each other; that is, reproduction of the music will not be obstructed by the centering pins.

As was described above, the centering mechanism 12 comprises the pair of centering arms 13 and 14, the centering lever 15, and the guide pin 26. That is, the centering mechanism is made up of relatively small number of components. Hence, the centering mechanism can be fabricated at relatively low manufacturing cost, and is high in durability as much.

As was described above, the vehicle disk player according to the invention has the centering mechanism for positioning a disk at the middle of the disk inserting opening. Therefore, even when an 8-cm disk is shifted sidewards from the middle of the disk inserting opening when inserted, it is guided to the middle of the disk inserting opening by the centering pins of the centering mechanism. Hence, the disk is positively fixedly mounted on the turn table, for reproduction of the music with the reading head.

The centering mechanism comprises; the pair of centering arms; and the centering lever which is reciprocated as the centering arms are rocked. Therefore, the small diameter disk can be positioned at the middle of the disk inserting opening when inserted thereinto as well as the large diameter disk.

Furthermore, the centering mechanism, being made up of a relatively small number of components, is excellent in economy and in durability.

Another embodiment of the invention will be described with reference to FIGS. 12 through 16.

Figure 13:
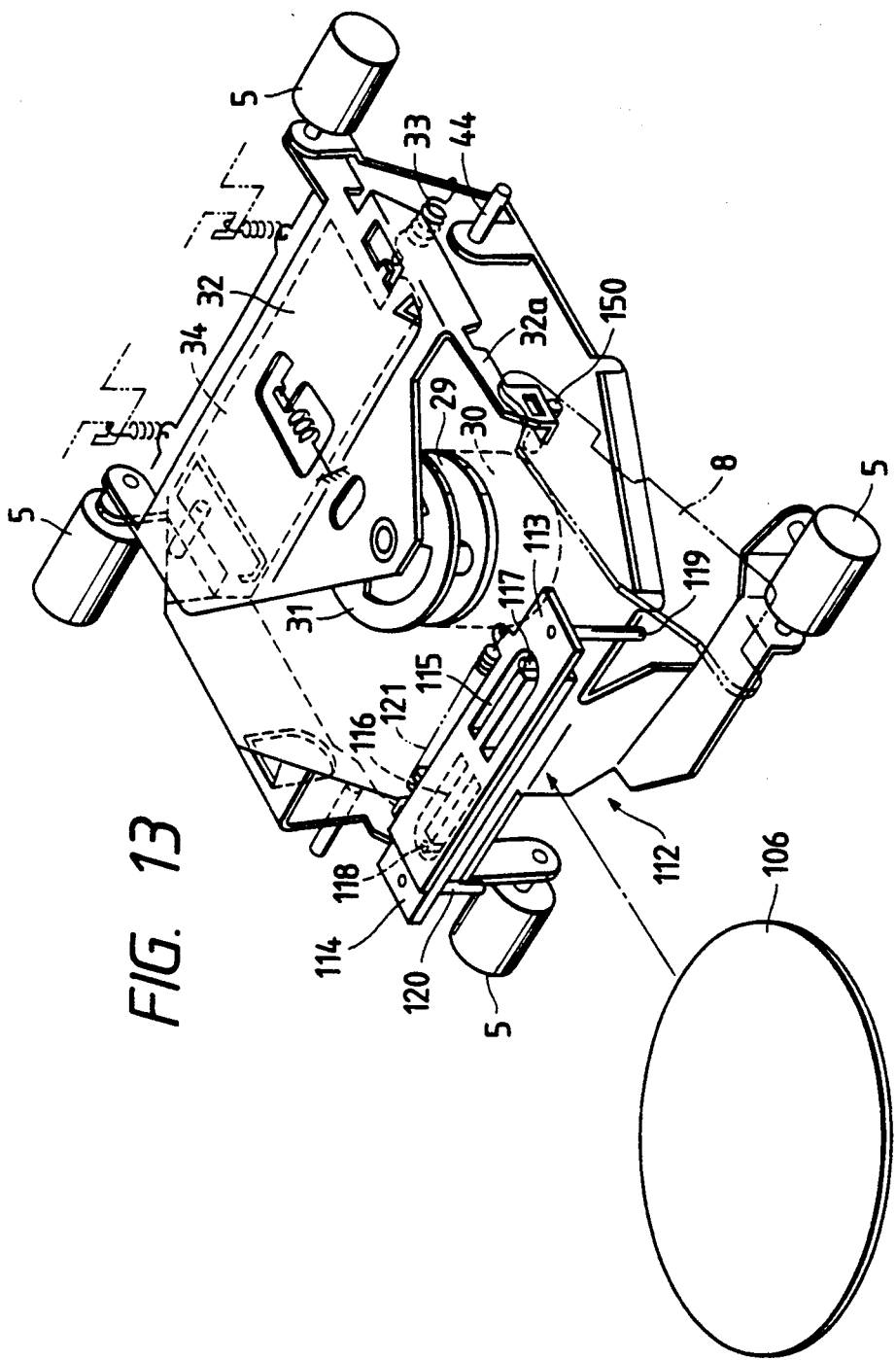
FIG. 13 is a perspective view showing a supporting frame with a centering mechanism in accordance with the embodiment of FIG. 12.
Figure 14A:
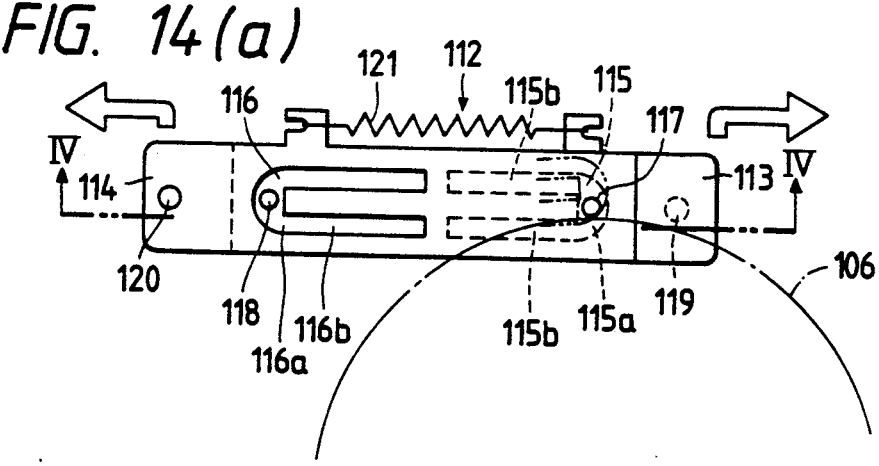
FIG. 14(a) is a plan view of the centering mechanism of FIG. 13.
Figure 14B:
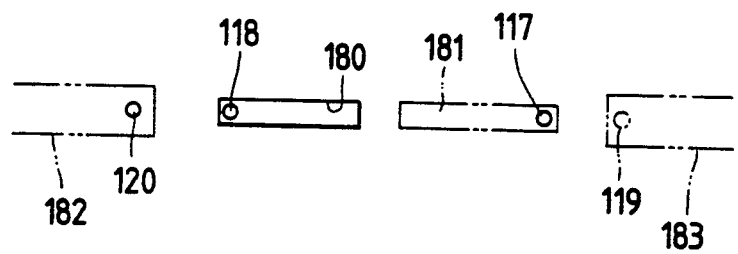
FIG. 14(b) is an explanatory diagram showing openings formed in a board which supports the centering mechanism.
Figure 15:
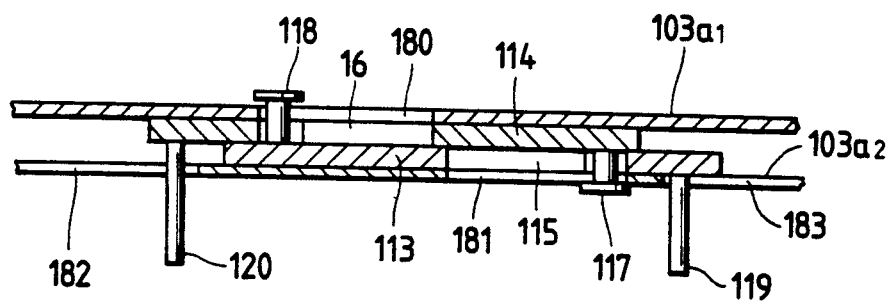
FIG. 15 is a perspective view showing one modification of the centering mechanism.

A centering mechanism 112, different from the above-described one, as shown in FIG. 13 is provided inside the frame 3 and near the disk inserting opening 2. The centering mechanism 112 is used to position a small diameter disk 106 at the middle of the disk inserting opening 2. The centering mechanism 112, as shown in the parts (a) and (b) of FIG. 14 and FIG. 15, comprises: a pair of centering boards 113 and 114 arranged so as to be slidable on each other; a pair of centering pins 119 and 120 which are embedded in the outer end portions of the centering boards 113 and 114, respectively; a pair of guide holes 115 and 116 formed in the centering boards 113 and 114, respectively; and a pair of guide pins which are inserted in the guide holes 115 and 116, respectively.

The pair of centering boards 113 and 114 are like flat plates which are slidably piled one on another in such a manner they are somewhat shifted from each other and extended in a direction substantially perpendicular to the disk inserting direction. The centering pin 119, which is an abutting member adapted to abut against the periphery of the compact disk, is embedded in the right end of the lower centering board 113 (in the part (a) of FIG. 14) in such a manner that it is extended towards the bottom of the CD player. Similarly, the centering pin 120 serving as an abutting member is embedded in the left end portion of the upper centering board 114. The guide hole 115 formed in the lower centering board 113 is in the form of the character "U" opened left. The guide hole 116 formed in the upper centering board 114 is also in the form of the character "U" opened right. That is, those guide holes 115 and 116 are formed symmetrical with each other The guide pin 117 embedded in the upper centering board 114 is loosely fitted in the lower guide hole 115, and similarly the guide pin 118 embedded in the lower centering board 113 is similarly loosely fitted in the upper guide hole 116. Those guide pins 117 and 118 are so arranged that, when the two centering boards 113 and 114 come close to each other, the guide pins 117 and 118 are positioned at the base portions 115$a$ and 115$b$ of the U-shaped guide holes 115 and 116, respectively.

A tension spring 121 is connected between the centering boards 113 and 114 so that the latter are urged towards each other. The centering mechanism 112 thus constructed is loosely held between upper and lower boards 103$a_1$ and 103$b_1$. The upper board 103$a_1$ has an elongated opening 180 to guide the guide pin 118. The lower board 103$b_1$ has an elongated opening 181 to guide the guide pin 117, and openings 183 and 182 wider than the opening 181 which allow the centering pins 119 and 120 to move away from each other. When the small diameter disk 106 is inserted into the disk inserting opening 2 with the centering pins 119 and 120 set close to each other, then the disk 106 is brought into contact with the centering pins 119 and 120.

If, in this operation, the small diameter disk 106 is shifted from the middle of the disk inserting opening 2, then it will brought into contact with one of the centering pins 119 and 120. When the disk is abutted against the right centering pin 119, the centering board 113 is slightly turned counterclockwise about the guide pin 118; that is, the guide hole 115 is moved upwardly (in the part (a) of FIG. 14), so that the guide pin 117 is abutted against the right end wall of a straightly-elongated portion of the U-shaped guide hole 115. As a result, the guide pin 117 is movable along the guide hole 115 to the left. On the other hand, the guide pin 118 is held positioned at the base portion 116$a$ of the guide hole 116; that is, it is not movable being abutted against the right side wall of the base portion 116$a$ of the guide hole 116. Accordingly, the centering pins 119 and 120 embedded in the centering boards 113 and 114 are not moved away from each other. As a result, the disk 106 thus inserted is moved to the middle of the disk inserting opening 2 by the centering pins 119.

Now, let consider the case where the large diameter 12-cm disk 101 is inserted into the disk inserting opening 2. In this case, the disk is abutted against the pair of centering pins 119 and 120 at the same time. Hence, the two guide holes 115 and 116 are moved upwardly (in the part (a) of FIG. 14) simultaneously, so that the pins 117 and 118 are positioned at the base-portion- side ends of the straightly-elongated portions 115$b$ and 116$b$ of the guide holes 115 and 116, respectively. Therefore, the guide pins 117 and 118 are made movable along the guide holes 116$b$ and 116 to the left and to the right, respectively; that is, the centering boards 113 and 114 are made movable away from each other. Hence, the centering pins 119 and 120 are moved away from each other by the disk 101, so that the latter 101 can be inserted into the vehicle CD player.

When the disk 106 or 101 has been inserted into the vehicle CD player, the centering pins are returned to their initial positions by the elastic force of the tension spring 121.

On the other hand, in the case where the large diameter 12-cm disk is inserted into the disk inserting opening 2, the centering mechanism operates in the same manner as in the case where the small diameter disk 106 is inserted thereinto.

As was described above, the centering mechanism for positioning the disk 101 or 106 at the middle of the disk inserting opening 2 is made up of: the pair of centering boards which are slidably piled one on another and are urged towards each other; the pair of centering pins which are embedded in the pair of centering boards, respectively, to abut against the periphery of the disk; the pair of U-shaped guide holes formed respectively in the centering boards in such a manner that they are symmetrical with each other; and the guide pins which are embedded in the centering boards and are loosely fitted in the guide holes, respectively. Therefore, the centering mechanism is simple in construction and smaller in the number of components, and accordingly it is excellent in economy and in durability.

When the disk 101 or 106 is ejected through the disk inserting opening 2 from the turn table 29, the disk is brought into contact with the two centering pins 119 and 120 simultaneously. As a result, the centering pins 119 and 120 are moved away from each other, thus permitting the ejection of the disk.

Figure 16:
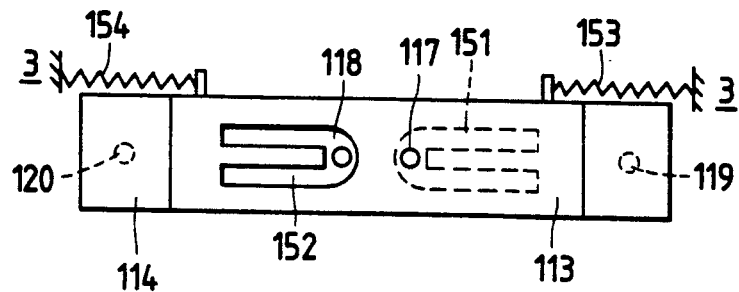
FIG. 16 is a schematic plan view of the U-goove centering mechanism shown in FIG. 15.

In the above-described embodiment, the U-shaped guide holes 115 and 116 are formed in the centering boards 113 and 114 in such a manner that they face towards each other; however, the invention is not limited thereto or thereby. For instance, as shown in FIG. 16, a pair of guide holes 151 and 152 may be formed in the centering boards 113 and 114, respectively, in such a manner that they are positioned back to back. In this modification, the centering mechanism will operate in the same manner as in the above-described embodiment. In the modification, compression springs 153 and 154 are connected between the frame 3 and the centering boards 113 and 114, respectively, as shown in FIG. 16.

As was described above, the disk player is provided with the centering mechanism which, according to the invention, comprises; the pair of centering boards which are slidably piled one on another and are elastically urged with respect to each other; the pair of centering pins which are embedded in the pair of centering boards, respectively, to abut against the periphery of the disk; the pair of U-shaped guide holes formed respectively in the centering boards in such a manner that they are symmetrical with each other; and the guide pins which are embedded in the centering boards and are loosely fitted in the guide holes, respectively. Therefore, even if the disk is shifted from the middle of the disk inserting opening when inserted therein, the disk is moved to the middle of the disk inserting opening by means of the centering pins.

The centering mechanism is simple in construction, and accordingly smaller in the number of components. That is, it is excellent in economy and in durability.

Figure 17:
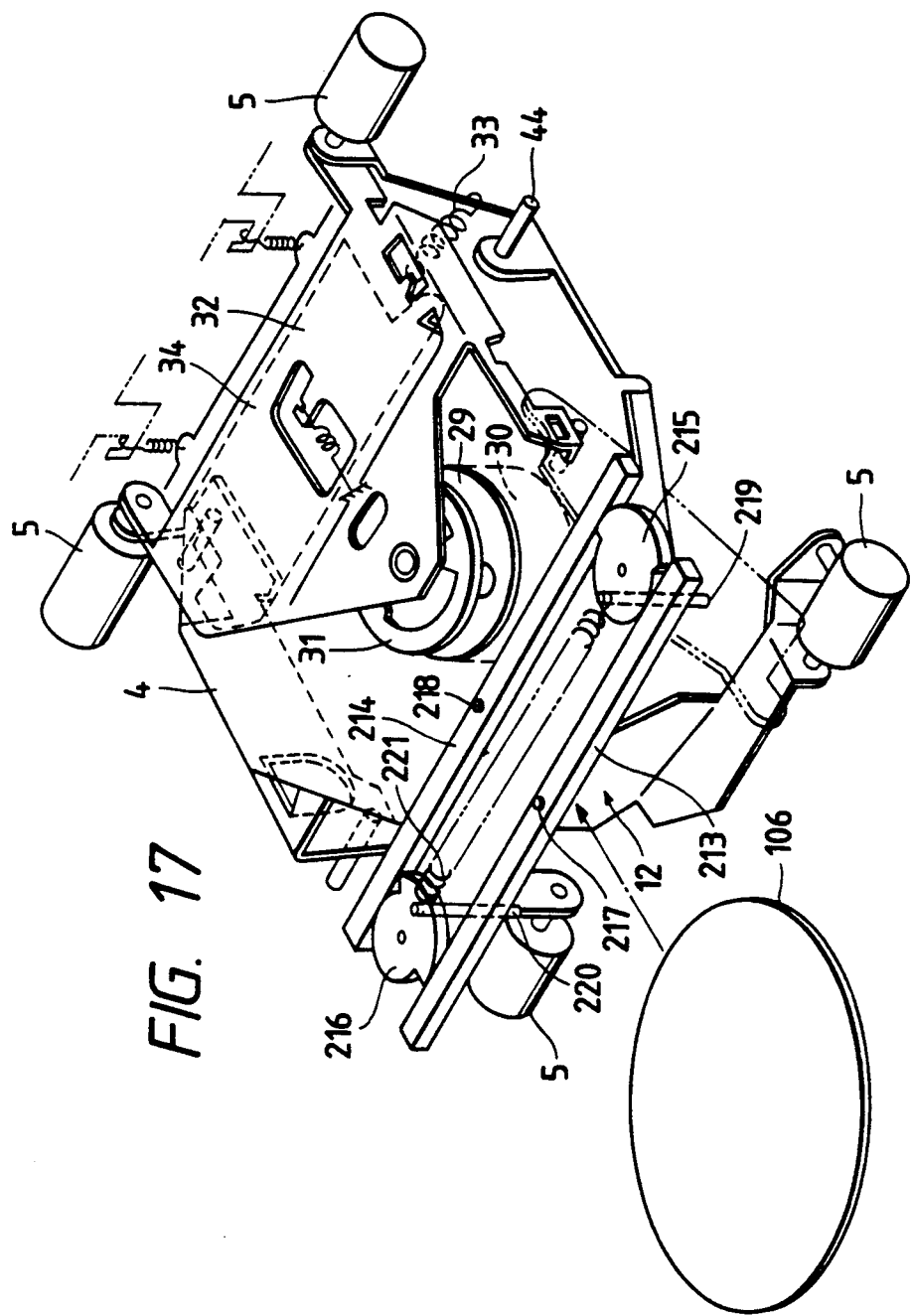
FIG. 17 shows a supporting frame with another modification of the centering mechanism.
Figure 18A:
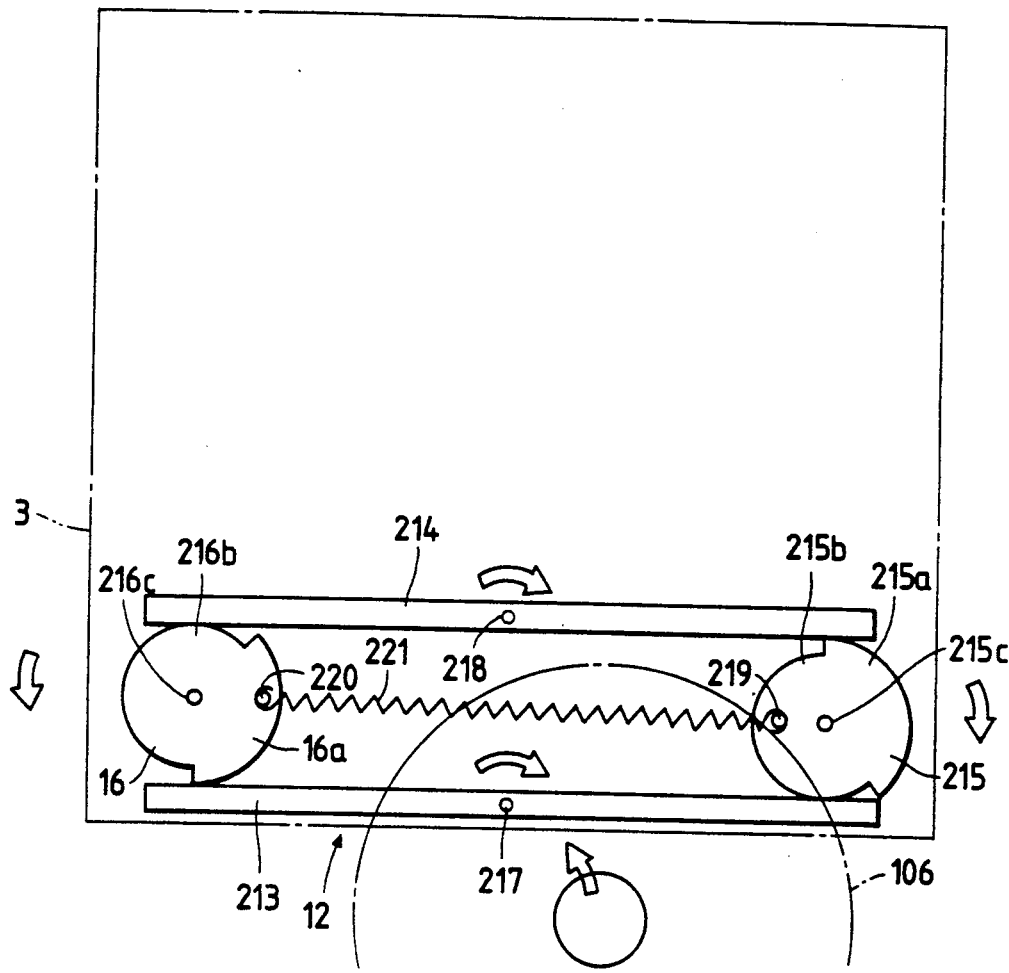
FIG. 18(a) is a plan view of the centering mechanism of FIG. 17.
Figure 18B:
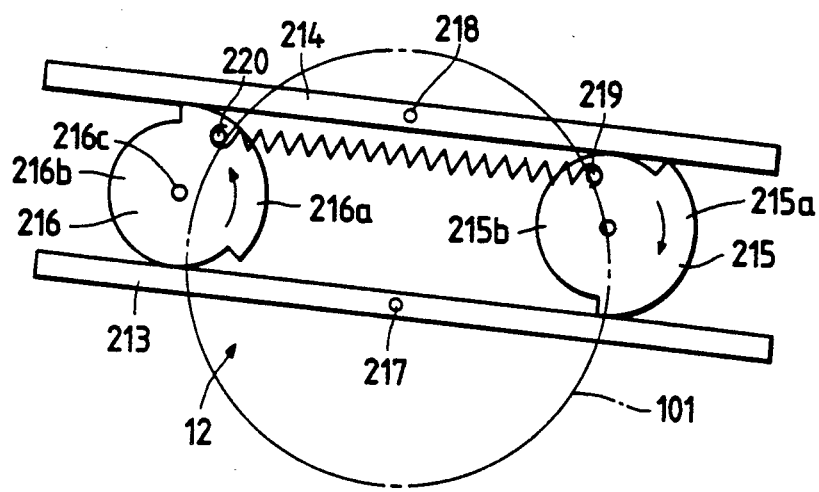

Another embodiment will be described with reference to FIGS. 17 and 18. The centering mechanism 12, as shown in FIG. 18, comprises: a pair of stopper arms 213 and 214; and a pair of centering cams 215 and 216 which are interposed between the stopper arms 213 and 214. The stopper arms 213 and 214 are so arranged that they are extended in a direction substantially perpendicular to the disk inserting direction and in parallel with each other. The stopper arms 213 and 214 are like elongated quadrangular prisms. The stopper arms 213 and 214 have supporting pins 217 and 218 at the middles so that they are swingably mounted on the frame 3 through the pins 217 and 218, respectively.

The two centering cams 215 and 216 are interposed between the end portions of the stopper arms 213 and 214, and are rotatably mounted on the frame 3 respectively through rotary shafts 215c and 216c. The centering cams 215 and 216 have arcuate large diameter portions 215a and 216a, and arcuate small diameter portions 215b and 216b. The small diameter portion 215b of the centering cam 215 is in contact with the stopper arm 213, and the large diameter portion 215a is in contact with the stopper arm 214. The large diameter portion 216a of the other centering cam 216 is in contact with the stopper arm 213, and the small diameter portion 216b is in contact with the stopper arm 214 The small diameter portion 215b of the centering cam 215 is faced towards the large diameter portion 216a of the centering cam 216. Centering pins are connected to the small diameter portion 215b and the large diameter portion 216a, respectively, in such a manner that they are extended towards the bottom of the CD player. More specifically, the base end portions of the centering pins 219 and 220 are protruded from the small diameter portion 215b and the large diameter portion 216a, respectively, and a tension spring 221 is connected between the base end portions of the centering pins 219 and 220. The tension spring 221 thus connected urges the centering cams 215 and 216 so that the stopper arms 213 and 214 are set at a reference position where they are extended in a direction perpendicular to the disk inserting direction. When the stopper arms 213 and 214 are at the reference position, the distance between the centering pins 219 and 220 is shortest.

Let us consider the case where the small diameter disk 106 is shifted from the middle of the disk inserting opening 2 when inserted therein. In this case, the disk will abut against one of the pair of centering pins 219 and 220. If the disk abuts against the centering pin 219 as shown in FIG. 18, then the centering cam 215 is going to be turned clockwise against the elastic force of the tension spring 221; that is, instead of the small diameter portion 215b, the large diameter portion 215a is going to be brought into contact with one end portion of the stopper arm 213; that is, the stopper arm 213 is going to be turned clockwise about the supporting pin 217. However, the clockwise rotation of the stopper arm 213 is prevented by the large diameter portion 216a of the centering cam 216 because the other end portion of the stopper arm 213 is held in contact with the large diameter portion 216a of the centering cam 216. Accordingly, the disk 106, which has been shifted from the middle of the disk inserting opening 2, is brought to the middle of the disk inserting opening 2 by the centering pin 219.

When the large diameter disk 101 is inserted into the disk inserting opening 2, it abuts against the pair of centering pins 219 and 220 simultaneously. As a result, the centering cams 215 and 216 are turned clockwise and counterclockwise, respectively, against the elastic force of the tension spring 221. In this case, while the large diameter portion 215a of the centering cam 215 is brought into contact with the stopper arm 213, the small diameter portion 216b of the centering cam 216 is be brought into contact with the stopper arm 213. At the same time, while the large diameter portion 216a of the centering cam 216 is brought into contact with the stopper arm 214, the small diameter portion 215b of the centering cam 215 is brought into contact with the stopper arm 214. Hence, the stopper arms 213 and 214 are turned clockwise about the supporting pins 217 and 18, respectively, so that the centering pins 219 and 220 are spaced away from each other, thus permitting the insertion of the disk 101 into the vehicle CD player.

When the disk 101 or 106 has been inserted into the vehicle CD player, the centering cams 215 and 216 and the stopper arms 213 and 214 are returned to the initial positions by the elastic force of the tension spring 221. In ejection of the disk from the player, it will not be locked even if shifted, because the cams are turned in such a manner that the cam diameters are maintained unchanged.

When the disk 101 or 106 is ejected from the turn table 219, the locking operation is not carried out by the centering mechanism 12, and therefore the centering pins 219 and 220 are moved away from each other, thus permitting the ejection of the disk.

The distance between the centering pins 219 and 220 may be larger than or smaller than the diameter of the small diameter disk 106. In the case where the distance is larger than the diameter of the disk, the latter will pass between the two centering pins; and in the case where it is smaller, when the disk comes to the middle of the disk inserting opening, it abuts against the two centering pins to pass between them while moving them away from each other.

As was described above, the disk player according to the invention has the centering mechanism which comprises: the pair of stopper arms which are arranged substantially in parallel with each other and are rockably supported; the pair of centering cam which are interposed between the pair of stopper arms, each having the large diameter portion and the small diameter portion; and the pair of centering pins embedded in the pair of centering cams, respectively, and elastically urged. Therefore, even if the disk is shifted from the middle of the disk inserting opening when inserted therein, it is positioned at the middle of the disk inserting opening by means of the centering means. Hence, the disk is positively mounted and fixed on the turn table, thus permitting reproduction of the music with the reading head.

The centering mechanism is simple in construction, and accordingly smaller in the number of components. Therefore, it is excellent in economy and in durability. In addition, since the centering mechanism occupies a small space in the disk inserting direction, the resultant disk player is compact.

Figure 19:
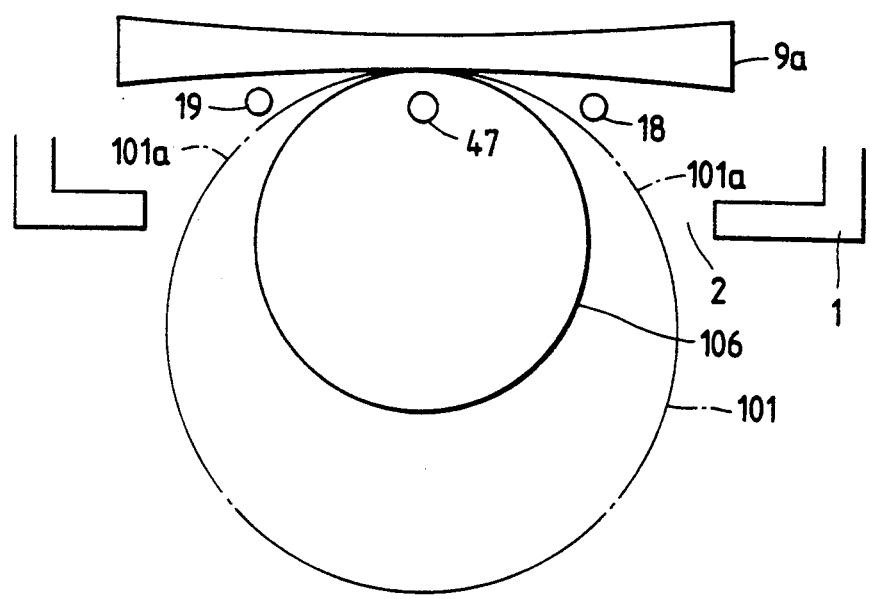
FIG. 19 shows a positional relationship of the sensor according to the invention.

In the any of the foregoing embodiments, as shown in FIG. 19, a photo sensor 47 may be provided substantially at the center of the top plate 3a of the frame 3 and near the disk inserting opening 2, to detect when the disk 106 is inserted into the disk inserting opening 2. Upon detection of the insertion of the disk, the photo sensor 47 applies a detection signal to a control circuit (not shown), so that the loading motor 10 is driven by the control circuit. As a result, the driving roller 9a cooperates with the driven roller 9b to convey the disk 106 thus inserted. The positional relationships among the disk 106 thus conveyed, the driving roller 9a, the photo sensor 47, and the centering pins 18 and 19 are as shown in FIG. 19. That is, the photo sensor 47 is so positioned that it confronts with the middle of the driving roller 9a, which is in the form of an elongated hand drum, on the disk inserting opening side. And the centering pins 18 and 19 are so positioned that, when the front end of the disk 106 positioned at the middle of the disk inserting is abutted against the driving roller 9a, they are located on both sides of the front end of the disk 106 and are spaced away from the disk 106. Therefore, when the disk 106 positioned substantially at the middle of the disk inserting opening 2 has been abutted against the driving roller 9a, the disk 106 is not brought into contact with the centering pins 18 and 19 yet.

When the large diameter disk 101 is positioned at the middle of the disk inserting opening 1, it abuts against the two centering pins 18 and 19 at the same time. As a result, the pair of centering arms 13 and 14 are turned about the supporting pins 176 and 17, respectively, and the centering lever 15 is caused to turn about the coupling pins 20 and 21. Therefore, the guide pin 26 will not be moved from the center of the circular head portion 15a of the elongated hole 25.

When the disk 101 of 12 cm in diameter is positioned above the turn table 29, the disk 101 is not fitted in the disk recess 35 of the operating assist board 34 because it is larger in diameter; that is, it is moved over the disk recess 35, so that its periphery is abutted against the detecting pin 41 directly.

When the disk 106 is inserted into the disk inserting opening 2, the photo sensor 47 detects the insertion of the disk 106, so that the loading motor 10 is driven by the control circuit. As a result, as shown in FIG. 19, the front end of the disk 106 is abutted against the rotating driving roller 9a, and nipped by the driving roller 9a and the driven roller 9b (FIG. 2). When the front end of the disk 106 has been nipped by the rollers 9a and 9b, it is not abutted against the centering pins 18 and 19 yet. When the disk 106 thus nipped is conveyed by the driving roller 9a towards the turn table 29, the disk 106 is brought into contact with, for example, the centering pins 18 and 19. When the disk 106 inserted into the disk inserting opening 2 is conveyed by the driving roller 9a as described above, the disk has been off the operator's hand Accordingly, when the disk strikes against the centering pins 18 and 19 thereafter, no unpleasant shock is given to the operator's hand In this operation, the disk 106 is positioned substantially at the middle of the disk inserting opening 2. Therefore, as was described before, the centering pins 18 and 19 are moved greatly away from each other as the centering arms 13 and 14 are turned, and the disk is conveyed towards the turn table.

Let us consider the case of inserting the large diameter disk 101. When the front end of the disk 101 is nipped by the rollers, the right and left peripheral parts 101a and 101a of the front end thus nipped are closer to the centering pins 18 and 19 than those of the small diameter disk 106; that is, the large diameter disk 101 is brought into contact with the centering pins 18 and 19 earlier than the small diameter disk.

As was described above, according to the invention the centering mechanism is provided in the disk player so that the disk is positioned at the middle of the disk inserting opening by means of the centering pins. Therefore, even if the disk is shifted from the middle of the disk inserting opening when inserted therein, the disk thus shifted is regulated by the centering pins so as to be positioned at the middle of the disk inserting opening. Accordingly, the disk is positively mounted and fixed on the turn table, for reproduction of the music with the reading head.

Furthermore, in the disk player of the invention, the centering pins are so positioned that, when the disk is positioned substantially at the middle of the disk inserting opening, it is abutted against the centering pins after its front end has been nipped by the loading rollers. That is, in the disk player of the invention, the disk is abutted against the centering pins after the loading rollers start conveyance of the disk which has been left from the operator's hand. Accordingly, no unpleasant shock will be given to the operator's hand when the disk is abutted against the centering pins.

We claim:

1. A vehicle disk player in which a compact disk is inserted through a disk inserting opening, said disk is fixedly mounted on a turntable by a clamper arm when conveyed to a predetermined position in said player, and said turntable is rotated for reproduction of data recorded in said disk, comprising: a centering mechanism which has a pair of centering boards which are slidably piled one on another and are urged towards each other; a pair of centering pins which are embedded in said pair of centering boards, respectively, to abut against the periphery of said disk; a pair of U-shaped guide holes formed respectively in said centering boards in such a manner that said guide holes are symmetrical with each other; and guide pins which are connected to said centering boards and are loosely fitted in said guide holes, respectively.

2. A vehicle disk player in which a disk is inserted through a disk inserting opening, said disk is fixedly mounted on a turntable by a clamper arm when conveyed to a predetermined position in said player, and said turntable is rotated for reproduction of data recorded in said disk, said disk player comprising: a centering mechanism provided near said disk inserting opening, for guiding a disk inserted therein to the middle of said disk inserting opening, said centering mechanism comprising:

a pair of stopper arms which are arranged in such a manner that said stopper arms are spaced from each other and are substantially in parallel with each other, and are rockable about fulcrums provided at middle portions thereof;

a pair of centering cams which are interposed between said pair of stopper arms at both ends, and are urged to take reference positions, respectively, each centering cam having a large diameter portion and a small diameter portion; and a pair of centering pins connected to said pair of centering cams, respectively, to abut against the periphery of said disk, in such a manner that the small diameter portion of one of said centering cams and the large diameter portion of the other of said centering cams are in contact with one of said stopper arms, while the large diameter portion of the one centering cam and the small diameter portion of the other centering cam are in contact with the other stopper arm, and wherein when said disk abuts against only one of said centering cams, said stopper arms are locked by the other centering cam, thus preventing rotation of the one centering cam, and when said disk abuts against both of said centering cams simultaneously, said centering cams are turned in opposite directions while unlocking said stopper arms, to incline said stopper arms in parallel, thus permitting the passage of said disk.

3. A vehicle disk player in which when a disk inserted into a disk inserting opening is abutted against loading rollers, said disk is conveyed by loading rollers to a predetermined position in said player, and is fixedly mounted on a turntable by a clamper arm, and said turntable is rotated for reproduction of data recorded in said disk, which player comprises: a centering mechanism provided near said disk inserting opening, for positioning said disk inserted into said disk inserting opening at the middle of said disk inserting opening, said centering mechanism including a pair of abutting members spaced away from each other, said abutting members being adapted to abut against the periphery of said disk thus inserted, and provided between said loading rollers and said disk inserting opening in such a manner that, when said disk is positioned substantially at the middle of said disk inserting opening when inserted thereinto, said abutting members are abutted against the periphery of said disk after the front end of said disk has been nipped by said loading rollers.

* * * * *